United States Patent
Chu et al.

(10) Patent No.: US 7,117,349 B2
(45) Date of Patent: *Oct. 3, 2006

(54) METHOD AND SYSTEM FOR RESTRICTING DHCP SERVERS

(75) Inventors: Simon C. Chu, Chapel Hill, NC (US); Richard A. Dayan, Raleigh, NC (US); James L. Matlock, Cary, NC (US); David B. Rhoades, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 477 days.

This patent is subject to a terminal disclaimer.

(21) Appl. No.: 10/675,624

(22) Filed: Sep. 30, 2003

(65) Prior Publication Data

US 2005/0071480 A1    Mar. 31, 2005

(51) Int. Cl.
  *G06F 15/177*  (2006.01)
  *G06F 9/24*   (2006.01)
  *G06F 9/00*   (2006.01)
(52) U.S. Cl. .............................. 713/1; 713/2; 713/100
(58) Field of Classification Search .................... 713/1, 713/2, 100
See application file for complete search history.

(56) References Cited

U.S. PATENT DOCUMENTS 6,314,520 B1 * 11/2001 Schell et al. .................. 726/13
2004/0193867 A1 * 9/2004 Zimmer et al. ................ 713/2

* cited by examiner

*Primary Examiner*—Lynne H. Browne
*Assistant Examiner*—Stefan Stoynov
(74) *Attorney, Agent, or Firm*—Martin J. McKinley; Dillon & Yudell LLP

(57) ABSTRACT

A method and system for managing a secure configuration of a server blade on a network. The server blade has a Remote Supervisor Adapter (RSA) card, which contains a list of trusted Dynamic Host Configuration Protocol (DHCP) servers. A remote manager, which communicates with the RSA card via a hyper-secure network, maintains the list of trusted DHCP servers on the RSA card. When the server blade broadcasts a request for configuration parameters to join the network, a response offer is returned from a DHCP server. If the responding DHCP server is not on the list of trusted DHCP servers contained in the RSA card, then the offer is refused, and another DHCP server's offer is evaluated.

15 Claims, 4 Drawing Sheets

METHOD AND SYSTEM FOR RESTRICTING DHCP SERVERS

RELATED APPLICATIONS

The present invention is related to the subject matter of the following commonly assigned, copending U.S. patent applications: Ser. No. 10/674,776 entitled "Method and System for Restricting PXE Servers" and filed Sep. 30, 2003. The content of the above-referenced application is incorporated herein by reference.

BACKGROUND OF THE INVENTION

1. Technical Field

The present invention relates in general to the field of computers, and in particular to multiple blade servers housed in a server chassis. Still more particularly, the present invention relates to a method and system for filtering, through a secure remote supervisor, responses from Dynamic Host Configuration Protocol (DHCP) servers to a blade server's request for network configuration parameters, such that responses to the request for configuration parameters are only accepted from trusted DHCP servers.

2. Description of the Related Art

Server blade computers offer multiple server blades (boards) in a single chassis (blade chassis). Although each server blade may be under at least partial control of a primary server blade in the chassis, each server blade typically functions as an independent server to specific clients. A typical arrangement of such as system is shown in FIG. 1, in which a blade chassis 102, having multiple server blades 103a–c, is connected to a network 106, which connects to multiple clients 104.

In order to initially connect to network 106, each of the server blades 103 may utilize a network identification protocol known as Dynamic Host Configuration Protocol (DHCP). DHCP allows each server blade 103 to obtain an Internet Protocol (IP) network address and other configuration parameters from a DHCP server in a configuration servers network 108.

To initialize on the network 106, a server blade 103 broadcasts a request for configuration parameters to configuration servers network 108. One or more of the DHCP servers in configuration servers network 108 responds back to server blade 103 with a dynamic IP address along with lease information and other configuration parameters. If responses from multiple DHCP servers in configuration servers network 108 are put on network 106, then server blade 103 typically responds to the first DHCP server response to arrive at server blade 103.

A network initialization of server blade 103 as described is not secure, since the broadcasted configuration parameter request can result in a response from any DHCP server connected to server blade 103, including an unauthorized DHCP server attempting mischief. What is needed, therefore, is a method and system that prevents server blade initialization by an unauthorized DHCP server.

SUMMARY OF THE INVENTION

The present invention is directed to a method and system for managing a secure configuration of a server blade on a network. The server blade has a Remote Supervisor Adapter (RSA) card, which contains a list of trusted Dynamic Host Configuration Protocol (DHCP) servers. A remote manager, which communicates with the RSA card via a hyper-secure network, maintains the list of trusted DHCP servers on the RSA card. When the server blade broadcasts a request for configuration parameters to connect to the network, a responsive offer is returned from a DHCP server. If the responding DHCP server is not on the list of trusted DHCP servers contained in the RSA card, then the offer is refused, and another DHCP server's offer is evaluated.

The above, as well as additional objectives, features, and advantages of the present invention will become apparent in the following detailed written description.

BRIEF DESCRIPTION OF THE DRAWINGS

The novel features believed characteristic of the invention are set forth in the appended claims. The invention itself, however, as well as a preferred mode of use, further purposes and advantages thereof, will best be understood by reference to the following detailed description of an illustrative embodiment when read in conjunction with the accompanying drawings, where:

FIG. 2b depicts details of software used by a server blade in the computer system shown in FIG. 2a.

DETAILED DESCRIPTION OF A PREFERRED EMBODIMENT

Figure 1:
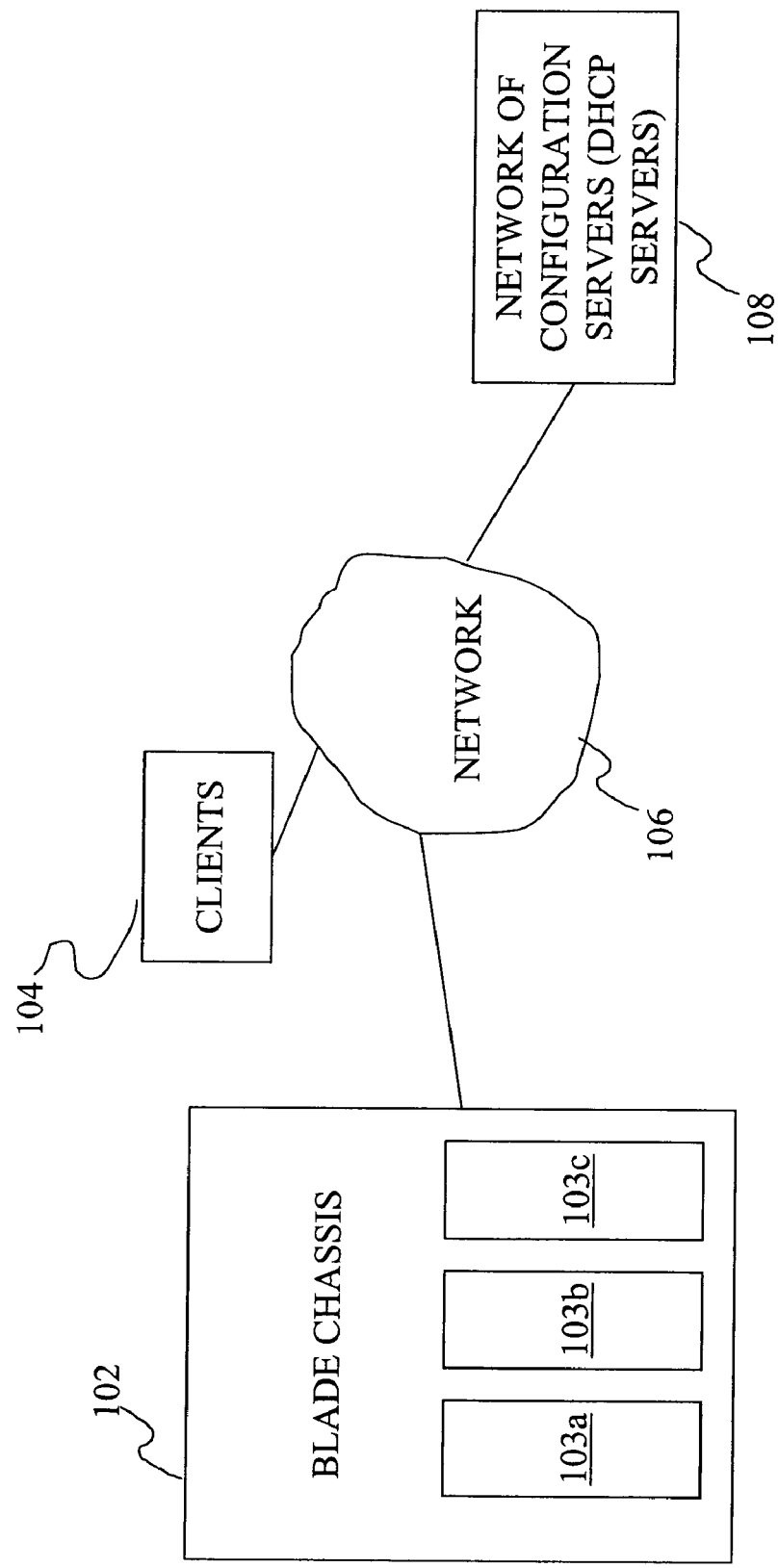
FIG. 1 depicts a prior art diagram of a network connecting a server blade computer (blade chassis) to a network of Dynamic Host Configuration Protocol (DHCP) servers.
Figure 2A:
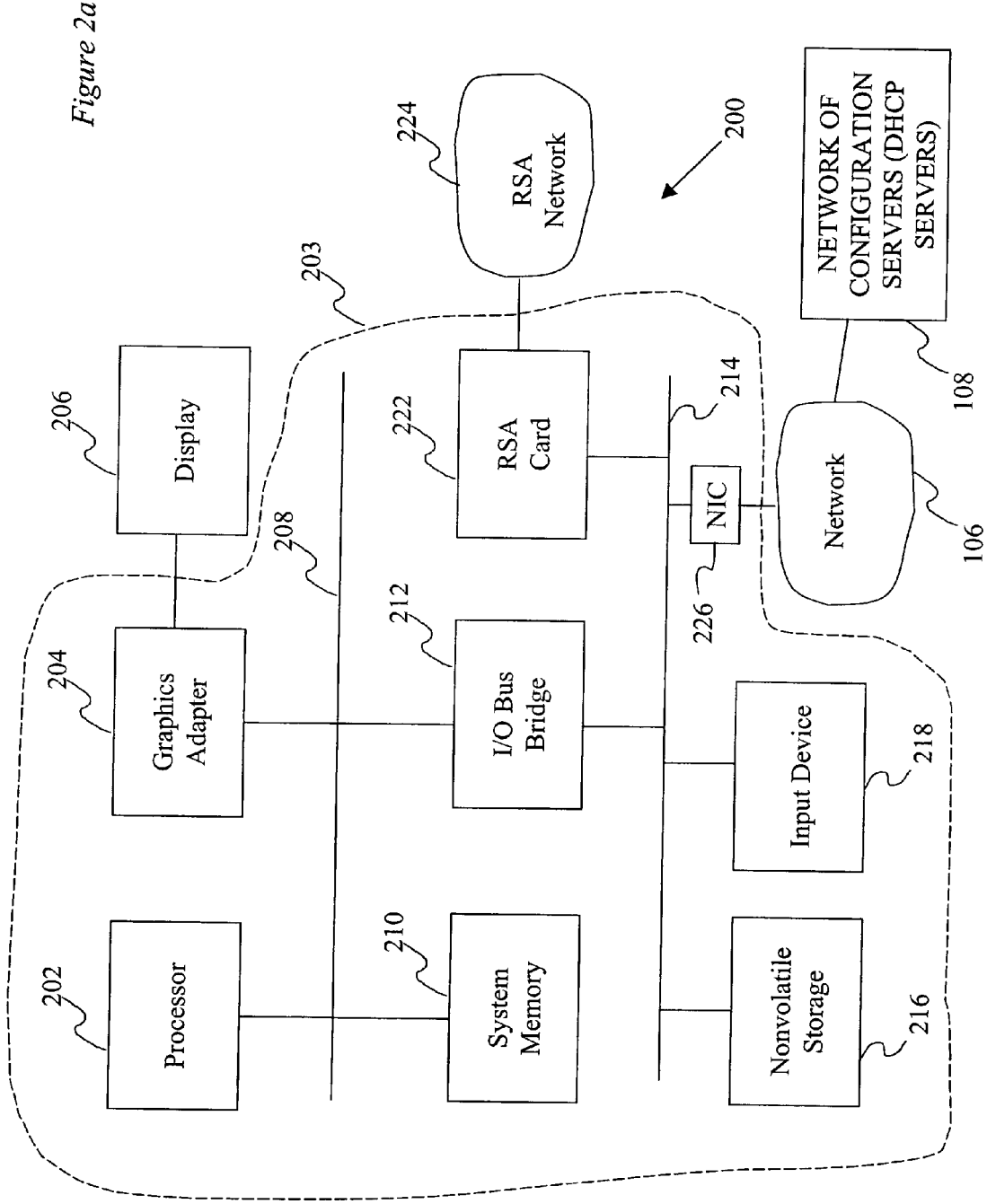
FIG. 2a illustrates a computer system utilizing the present invention.

With reference now to FIG. 2a, there is depicted a block diagram of a data processing system in which a preferred embodiment of the present invention may be implemented. Data processing system 200 includes multiple server blades, including a depicted server blade 203. Each server blade 203 includes a processor 202, which is preferably a plurality of processors (multi-processors) operating in a coordinated manner. Processor 202 is connected to a system bus 208. In the exemplary embodiment, server blade 203 includes a graphics adapter 204, also connected to system bus 208, for providing interface information on display 206.

Also connected to system bus 208 are system memory 210 and input/output (I/O) bus bridge 212. I/O bus bridge 212 couples I/O bus 214 to system bus 208, relaying and/or transforming data transactions from one bus to the other. Peripheral devices such as nonvolatile storage 216, which may be a hard disk drive, floppy drive, a compact disk read-only memory (CD-ROM), a digital video disk (DVD) drive, or the like, and input device 218, which may include a conventional mouse, a trackball, or the like, are connected to I/O bus 214. Server blade 203 communicates to network 106 via a network interface card (NIC) 226 and to a hyper-secure Remote Supervisor Adapter (RSA) network 224 via an RSA card 222 as shown.

The exemplary embodiment shown in FIG. 2a is provided solely for the purposes of explaining the invention and those skilled in the art will recognize that numerous variations are possible, both in form and function. For instance, data processing system 200 might also include a sound card and audio speakers, and numerous other optional components. All such variations are believed to be within the spirit and scope of the present invention.

Figure 2B:
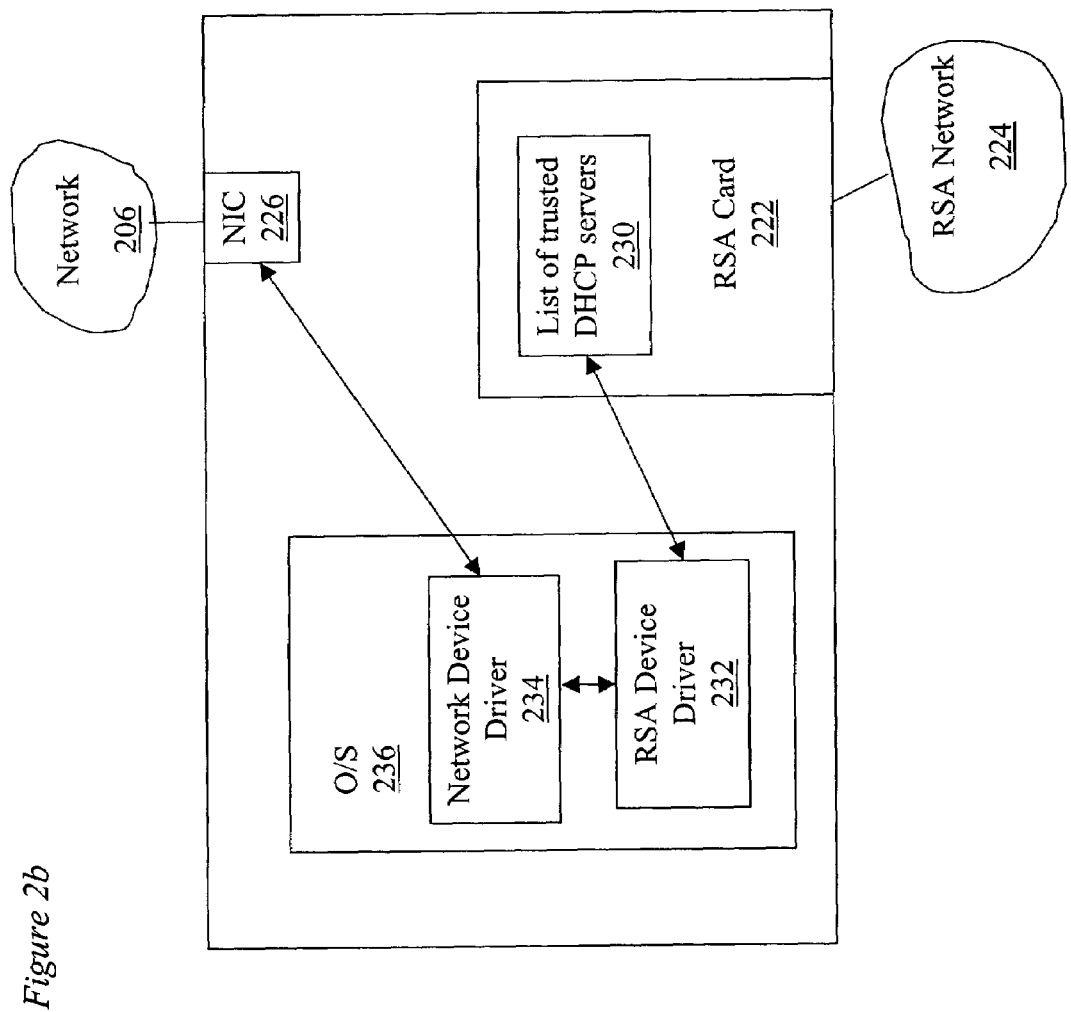

FIG. 2b illustrates details of software used by server blade 203 in the present invention. An operating system (O/S) 236 includes a network device driver 234, which obtains and utilizes an IP address obtained from a DHCP server. Control over whether to accept the IP address is determined by RSA device driver 232, which determines whether the IP address is acceptable according to which DHCP server supplied the address. This determination is based on a list of trusted DHCP servers 230 maintained in RSA card 222. RSA card 222 and the list of trusted DHCP servers 230 are preferably under the control of a remote configuration server or manager (not shown) communicating with server blade 203 via hyper-secure RSA network 224.

Figure 3:
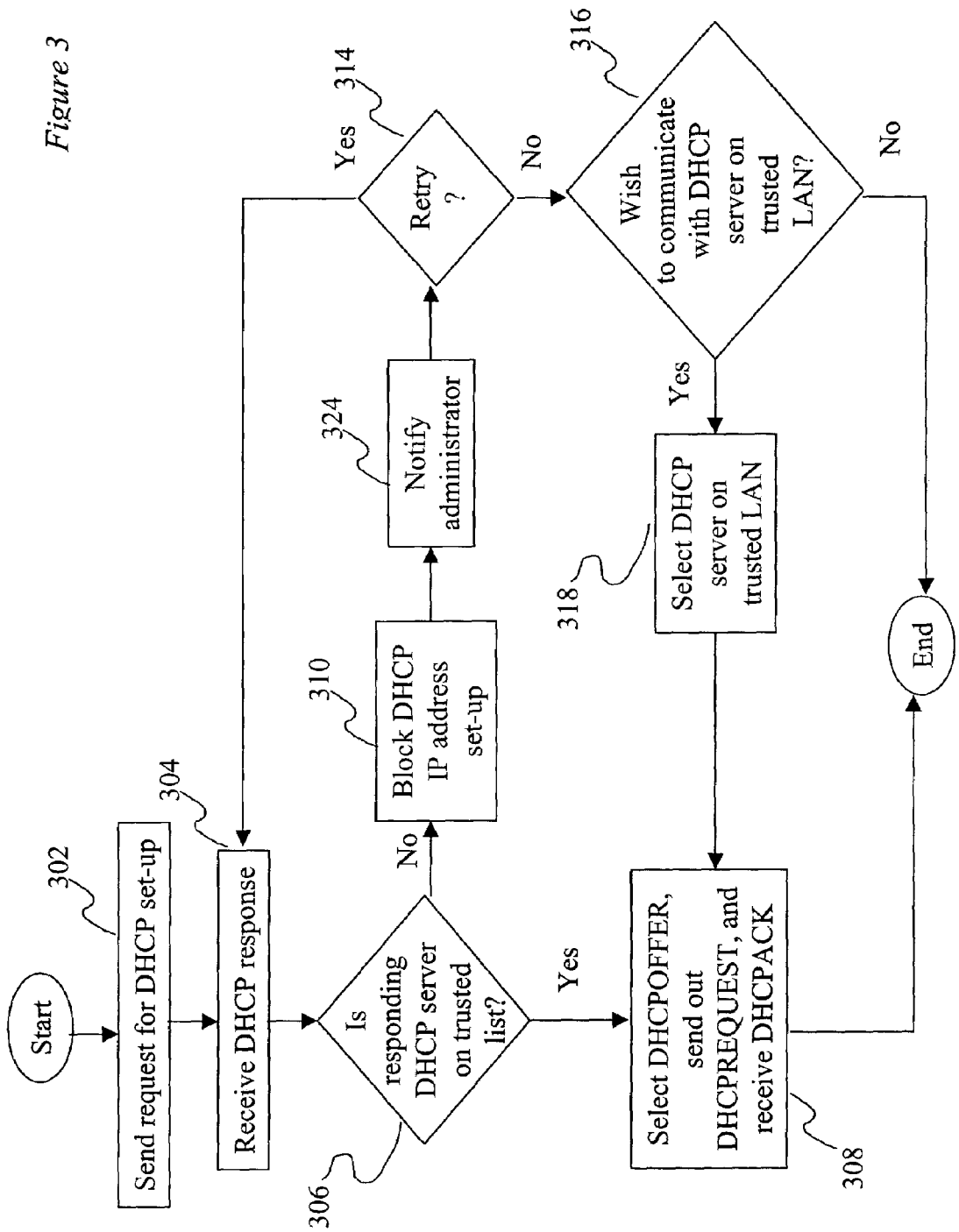
FIG. 3 is a flow-chart of steps taken in a preferred embodiment of the present invention.

FIG. 3 is a flow-chart of a preferred embodiment of the present invention. A request is sent out to a network (e.g., configuration server network 108 shown in FIG. 2) requesting a DHCP set-up (block 302). A DHCP set-up provides configuration parameters to the server blades. DHCP is an extension of BOOTP, an IP allocation specification. DHCP supports the concept of a "lease" of an IP address, in which a DHCP server allocates an IP address to the server blade for a pre-determined period of time. The server blade broadcasts a DHCPDISCOVER packet to the network of DHCP servers. DHCP servers on the network detect the broadcast and return a DHCPOFFER packet that contains an offered IP address for the blade server and other configuration information (block 304). The DHCP servers conduct preliminary testing before offering the addresses, such as determining if the offered IP address is already in use by another node on the network.

The server blade might receive multiple DHCPOFFER packets from different DHCP servers. According to the present invention, rather than simply accepting the first DHCPOFFER packet received, the server blade compares the IP address of the responding DHCP server, found in the DHCPOFFER packet, with the list of trusted DHCP servers in the RSA card (block 306). If multiple DHCPOFFER packets are received from a legitimate DHCP server, the server blade selects one of the DHCPOFFER packets based on some predetermined criteria, such as which packet was received first, which packet offers the longest lease, or which DHCP server provides the most information that the specific server blade needs for optimal operation. After selecting the preferred DHCP packet, the server blade sends out a DHCPREQUEST packet to the DHCP server that sent the selected DHCPOFFER packet. Assuming that the offer is still valid, the chosen DHCP server then returns a DHCPACK acknowledgment packet that tells the server blade that the lease is finalized (block 308), turning over ownership and maintenance of the lease to the server blade.

If a DHCPOFFER is from an unauthorized DHCP server not on the trusted list, DHCP controlled IP address allocation and set-up is blocked (block 310) and an administrator is notified, via a Simple Network Management Protocol (SNMP) trap, of the presence of an unauthorized DHCP server on the network (block 312). A choice is then made (decision block 314) as to whether to receive and evaluate another DHCPOFFER (block 314). If not, then a decision is made whether to send a DHCPREQUEST directly to one of the trusted DHCP servers, preferably a DHCP server on a local secure LAN (blocks 316 and 318). If so, then that trusted server provides network configuration parameters as described above.

The present invention thus provides the means and method for a computer to connect to an open network under the control of a remote supervisor. By controlling and maintaining the list of trusted DHCP servers, the remote supervisor is able to control if and how a specific blade server connects to a network. This allows the remote supervisor to control the IP address, domain name, and other network configuration parameters in order to have an orderly arranged network. While the present invention focuses on server blades, it is understood that any computer, particularly those with remote supervisor capabilities, utilizing the described invention is within the purpose and scope of the present invention.

It should be understood that at least some aspects of the present invention may alternatively be implemented in a program product. Programs defining functions on the present invention can be delivered to a data storage system or a computer system via a computer program product, residing on any of a variety of computer usable media, which include, without limitation, non-writable storage media (e.g., CD-ROM), writable storage media (e.g., a floppy diskette, hard disk drive, read/write CD ROM, optical media), and communication media, such as computer and telephone networks including Ethernet. It should be understood, therefore in such computer usable media when carrying or encoding computer readable instructions that direct method functions in the present invention, represent alternative embodiments of the present invention. Further, it is understood that the present invention may be implemented by a system having means in the form of hardware, software, or a combination of software and hardware as described herein or their equivalent.

While the invention has been particularly shown and described with reference to a preferred embodiment, it will be understood by those skilled in the art that various changes in form and detail may be made therein without departing from the spirit and scope of the invention.

What is claimed is:

1. A method for obtaining configuration parameters for connecting to a network, the method comprising:
   storing, under a control of a remote management computer that is connected to a client computer, a list of trusted configuration servers in a Remote Supervisor Adapter (RSA) card on the client computer;
   broadcasting a request for a configuration parameter from the computer to a plurality of configuration servers;
   receiving a response to the request for the configuration parameter at the client computer, the response being from a responding configuration server from the plurality of configuration servers;
   comparing an identity of the responding configuration server with the list of trusted configuration servers;
   upon verifying that the responding configuration server is on the list of trusted configuration servers, requesting configuration parameters from the responding configuration server;
   in response to determining that the responding configuration server is not on a list of trusted configuration servers, selecting, by the client computer, a selected server from one of the servers on the list of trusted configuration servers; and
   requesting, by the client computer, the configuration parameters from the selected server.

2. The method of claim 1, further comprising:
   in response to determining that the responding configuration server is not on the list of rusted configuration servers, generating an alert to a designated administrator of a presence of an unauthorized configuration server in the plurality of configuration servers.

3. The method of claim 1, wherein the responding configuration server is a Dynamic Host Configuration Protocol (DHCP) server.

4. The method of claim 1, wherein the remote management computer is a part of an Information Technology (IT) services organization that manages various types of Pre-boot eXecution Environment (PXE) deployment servers, and wherein the IT services organization enables a same IT service organization assigned systems administrator to manage the various types of PXE deployment servers, to maintain permission lists for each PXE server type, to monitor a network for a presence of unauthorized PXE servers that are not authorized, by the IT services organization, to support the client computer, and to shut down network ports, for unauthorized PXE servers, in the client computer.

5. The method of claim 1, wherein the remote management computer performs the storing of the list of trusted configuration servers in the RSA card on the client computer.

6. A system for obtaining configuration parameters for connecting to a network, the system comprising:
  means for storing, under a control of a remote management computer that is connected to a client computer, a list of trusted configuration servers in a Remote Supervisor Adapter (RSA) card on the client computer;
  means for broadcasting a request for a configuration parameter from the computer to a plurality of configuration servers;
  means for receiving a response to the request for the configuration parameter at the client computer, the response being from a responding configuration server from the plurality of configuration servers;
  means for comparing an identity of the responding configuration server with the list of trusted configuration servers;
  means for upon verifying that the responding configuration server is on the list of trusted configuration servers, requesting configuration parameters from the responding configuration server;
  means for in response to determining that the responding configuration server is not on a list of trusted configuration servers, selecting, by the client computer, a selected server from one of the servers on the list of trusted configuration servers; and
  means for requesting, by the client computer, the configuration parameters from the selected server.

7. The system of claim 6, further comprising:
  means for, in response to determining that the responding configuration server is not on the list of rutsted configuration servers, generating an alert to a designated administrator of a presence of an unauthorized configuration server in the plurality of configuration servers.

8. The system of claim 6, wherein the responding configuration server is a Dynamic Host Configuration Protocol (DHCP) server.

9. The system of claim 6, wherein the remote management computer is a part of an Information Technology (IT) services organization that manages various types of Pre-boot eXecution Environment (PXE) deployment servers, and wherein the IT services organization enables a same IT service organization assigned systems administrator to manage the various types of PXE deployment servers, to maintain permission lists for each PXE server type, to monitor a network for a presence of unauthorized PXE servers that are not authorized, by the IT services organization, to support the client computer, and to shut down network port, for unauthorized PXE sewers, in the client computer.

10. The system of claim 6, wherein the remote management computer performs the storing of the list of toasted configuration servers in the RSA card on the client computer.

11. A computer program product, residing on a computer usable medium, for obtaining configuration parameters for connecting to a network, the computer program product comprising:
  program code for storing, under a control of a remote management computer that is connected to a client computer, a list of trusted configuration servers in a Remote Supervisor Adapter (RSA) card on the client computer;
  program code for broadcasting a request for a configuration parameter from the computer to a plurality of configuration servers;
  program code for receiving a response to the request for the configuration parameter at the client computer, the response being from a responding configuration server from the plurality of configuration servers;
  program code for comparing an identity of the responding configuration server with the list of trusted configuration servers;
  program code for, upon verifying that the responding configuration server is on the list of trusted configuration servers, requesting configuration parameters from the responding configuration server;
  program code for in response to determining that the responding configuration server is not on a list of trusted configuration servers, selecting, by the client computer, a selected server from one of the servers on the list of trusted configuration servers; and
  program code for requesting, by the client computer, the configuration parameters from the selected server.

12. The computer program product of claim 11, further comprising:
  program code for, in response to determining that the responding configuration server is not on the list of rusted configuration servers, generating an alert to a designated administrator of a presence of an unauthorized configuration server in the plurality of configuration servers.

13. The computer program product of claim 11, wherein the responding configuration server is a Dynamic Host Configuration Protocol (DHCP) server.

14. The computer program product of claim 11, wherein the remote management computer is a part of an Infomation Technology (IT) services organization that manages various types of Pre-boot eXecution Environment (PXE) deployment servers, and wherein the IT services organization enables a same IT service organization assigned systems administrator to manage the various types of PXE deployment servers, to maintain permission lists for each PXE server type, to monitor a network for a presence of unauthorized PXE servers that are not authorized, by the IT services organization, to support the client computer, and to shut down network ports, for unauthorized PXE servers, in the client computer.

15. The computer program product of claim 11, wherein the remote management computer performs the storing of the list of trusted configuration servers in the RSA card on the client computer.

* * * * *